Sept. 1, 1931.  R. E. POOLE  1,821,767
CLOVER SEED HULLER AND SCARIFIER
Filed April 20, 1928   2 Sheets-Sheet 2
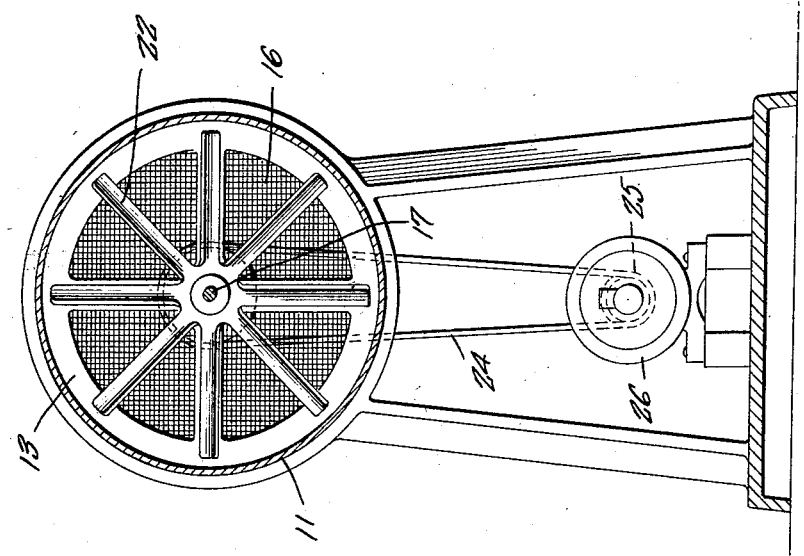
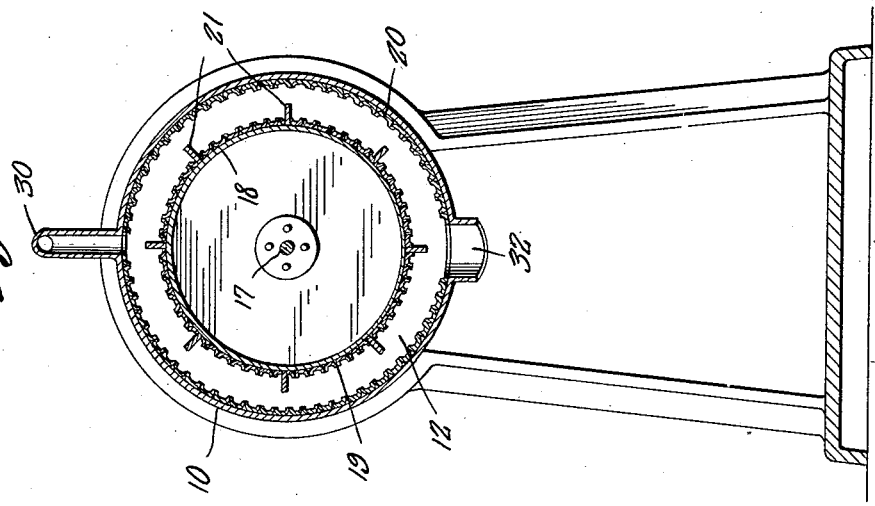
Ralph E. Poole,
INVENTOR
BY Victor J. Evans
ATTORNEY Patented Sept. 1, 1931

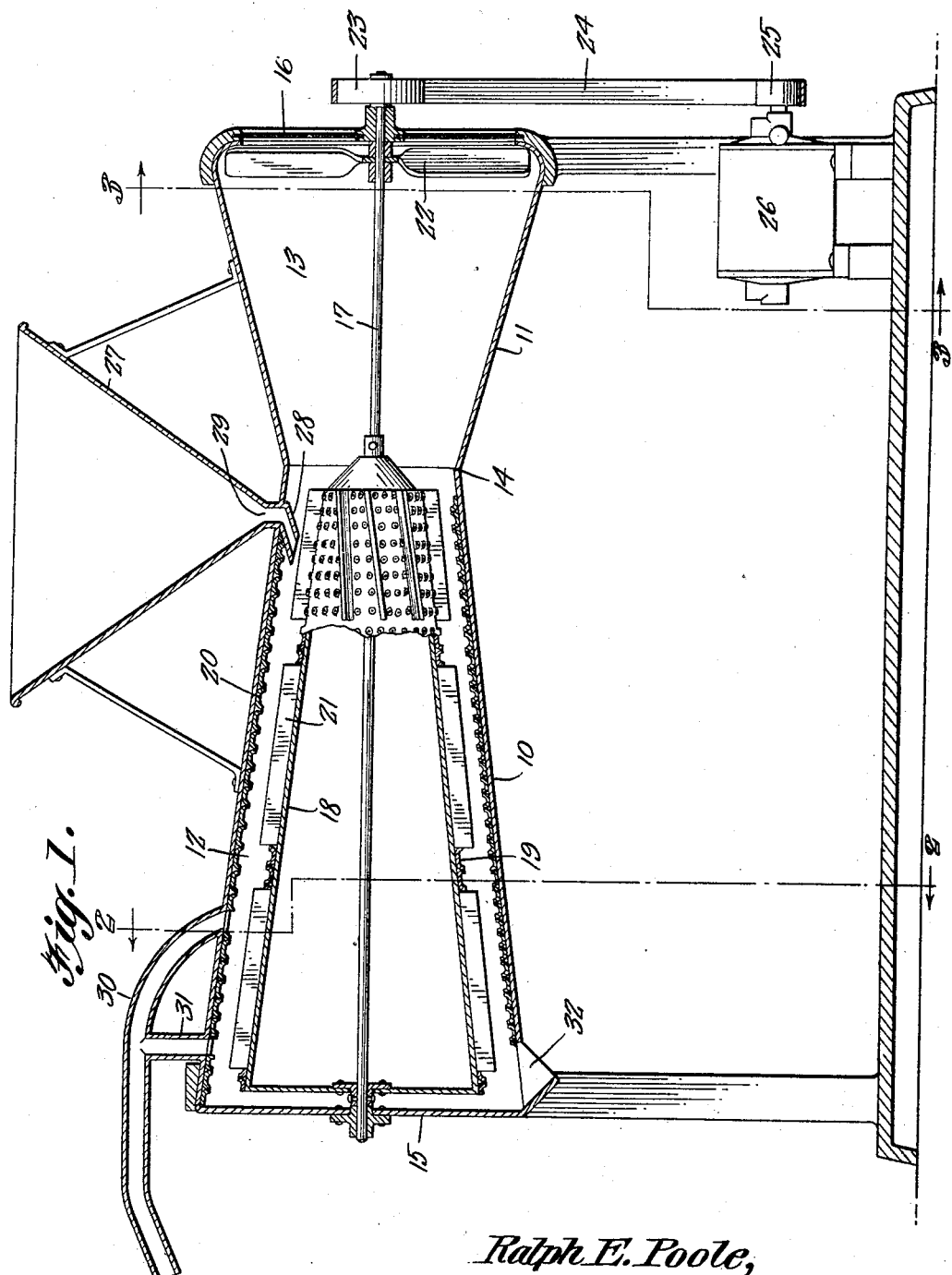

1,821,767

UNITED STATES PATENT OFFICE

RALPH EDWIN POOLE, OF HARLAN, IOWA

CLOVER SEED HULLER AND SCARIFIER

Application filed April 20, 1928. Serial No. 271,584.

This invention relates to seed hulling and scarifying machines, an object being to provide a machine which is especially adapted for hulling and scarifying clover seed, and for separating the hulls from the seed so that the latter will be in proper condition for rapid germination when planted.

Another object of the invention is the provision of a machine of the above character whose casing is divided into a hulling and scarifying compartment and a compression compartment, so that the seed in addition to being acted upon by a beater in the hulling and scarifying compartment will be also acted upon by air furnished by a force fan within the compression compartment, where the air is compressed to be expanded as it enters the hulling and scarifying compartment and thus assist in agitating the seed hulls to carry off the dust and hulls from the machine.

Another object of the invention of the provision of a hulling and scarifying surface of novel construction which acts upon the seed to remove the hulls and to scarify and prepare the seed for the purpose above stated.

With the above and other objects in view, the invention further includes the following novel features and details of construction, to be hereinafter more fully described, illustrated in the accompanying drawings and pointed out in the appended claim.

In the drawings:

Figure 1 is a longitudinal sectional view of a machine constructed in accordance with the invention.

Figures 2 and 3 are sections taken respectively on the lines 2—2 and 3—3 of Figure 1.

Referring to the drawings in detail wherein like characters of reference denote corresponding parts, the machine comprises a casing which is circular in cross section and formed of a pair of frusto conical sections 10 and 11 which are connected at their smaller ends. The construction provides a combined hulling and scarifying compartment 12 and a compression compartment 13, the compartment 12 being of greater length than the compartment 13 while communication is established between these compartments through the restricted portion 14 of the casing.

The outer end of the compartment 12 is closed as indicated at 15 while the outer end of the compartment 13 is provided with a foraminous wall 16 of any suitable material.

Extending longitudinally through the machine is a shaft 17 and secured upon this shaft is a hollow beater 18. This beater is located within the compartment 12 and is of frusto-conical shape and is spaced from the wall of the compartment 12. The beater is provided with a cover 19 while the compartment 12 is provided with a lining 20 which is spaced from and opposed to the cover 19. The cover 19 and lining 20 are of like construction, being formed of sheet metal having openings punched therethrough with the material around these openings extending outward so that a grater-like surface is provided. The casing and the beater however are formed of imperforate material. The beater 18 is also provided with spaced beater blades 21 which are preferably slightly inclined with respect to the longitudinal center of the beater.

Also mounted upon the shaft 17 is a force fan 22. This fan is located at the outer or large end of the compression chamber 13 and mounted upon the shaft 17 upon the outside of the casing is a pulley 23. This pulley is driven by means of a belt 24 from a pulley 25 which is mounted upon the shaft of a motor 26.

Mounted upon the casing is a feed hopper 27, a chute 28 extending from the lower end of this hopper into the chamber 12 so that seed placed within this hopper may be fed into the chamber to be acted upon by the beater and the lining 20. A slide 29 controls the feed of seed to the machine.

Extending from the larger end of the compartment 12 is a pipe or conduit 30 which also communicates with the compartment 12 through a branch pipe 31. The pipes 30 and 31 are designed to carry off dust, hulls, etc. from the compartment 12 while seed is discharged from the compartment through a discharge spout 32.

The beater 18 is rotated through the operation of the motor 26 and seed fed into the compartment 12 from the hopper 27 will be taken up by the grater-like cover 19 of the beater and thrown against the grater-like lining 20 of the compartment 12. The blades 21 will also take up the seed and throw them against the lining 20 with increased force, so that the hulls will be broken and removed from the seed. When using the machine simply as a scarifier, the blades 21 may be removed.

The fan 22 forces air from the chamber 13 to the chamber 12 and as the air passes from the chamber 13 at the restricted end, the air will be compressed and will pass into the chamber 12 through the restricted portion 14, expanding as it passes through this chamber. The force of this air will assist in agitating the seed and will carry off the dust and hulls through the pipes 20 and 31, while the seed will pass out through the discharge spout 32.

The invention is susceptible of various changes in its form, proportions and minor details of construction and the right is herein reserved to make such changes as properly fall within the scope of the appended claim.

Having described the invention what is claimed is :—

A clover seed huller and scarifier comprising a casing having its opposite end portions cone-shaped, the smaller ends of said cone shaped portions being joined together, one of the said end portions being open at its outer end, a vertical wall closing the outer end of the other portion, a fan located in the open outer end of one of said portions and adapted to discharge a blast of air through the smaller ends of the cone-shaped portion into the portion having the closed outer end, a cone-shaped beater journaled for rotation in that end portion of the casing having the closed outer end and the larger end of said beater being spaced from the outer end wall of said portion, a hopper having a discharge outlet located above the smaller end of the beater, the casing having gust outlet passage-ways located above the larger end of the beater and the casing having a seed outlet opening located below the larger end of the beater and at the lower edge of the end closure wall of that end portion of the casing in which the beater is located.

In testimony whereof I affix my signature.

RALPH EDWIN POOLE.